Aug. 4, 1931.                R. CROSS                  1,816,827
             APPARATUS FOR TREATING HYDROCARBONS
             Original Filed Jan. 20, 1926    2 Sheets-Sheet 2

Patented Aug. 4, 1931

1,816,827

UNITED STATES PATENT OFFICE

ROY CROSS, OF KANSAS CITY, MISSOURI, ASSIGNOR TO CROSS DEVELOPMENT CORPORATION, OF WILMINGTON, DELAWARE, A CORPORATION OF DELAWARE

APPARATUS FOR TREATING HYDROCARBONS

Original application filed January 20, 1926, Serial No. 82,465. Divided and this application filed April 5, 1926. Serial No. 99,838.

This invention relates to improvements in an apparatus for treating hydrocarbons, and refers more particularly to the desulphurizing, decolorizing and polymerizing of the objectionable materials from the hydrocarbons, preferably while they are in the vapor phase, and from hydrocarbons from which the heavier fractions have already been eliminated.

This application is a division of a prior application filed January 20, 1926, Serial No. 82,465.

Novelty lies in the character of the apparatus, particularly in the utilization of separate towers for a treatment of hydrocarbon vapors to eliminate the sulphur compounds, and a secondary treatment with an adsorptive material to effect further purification. Furthermore, these towers are furnished in pairs in order that any one of the towers may be cut out of the system and in order that one of the towers of either type may be used with either of the towers of the other type to assure a relatively continuous operation.

The apparatus is an improvement of the invention shown in application Serial No. 64,137, dated October 22, 1925.

Figure 1:
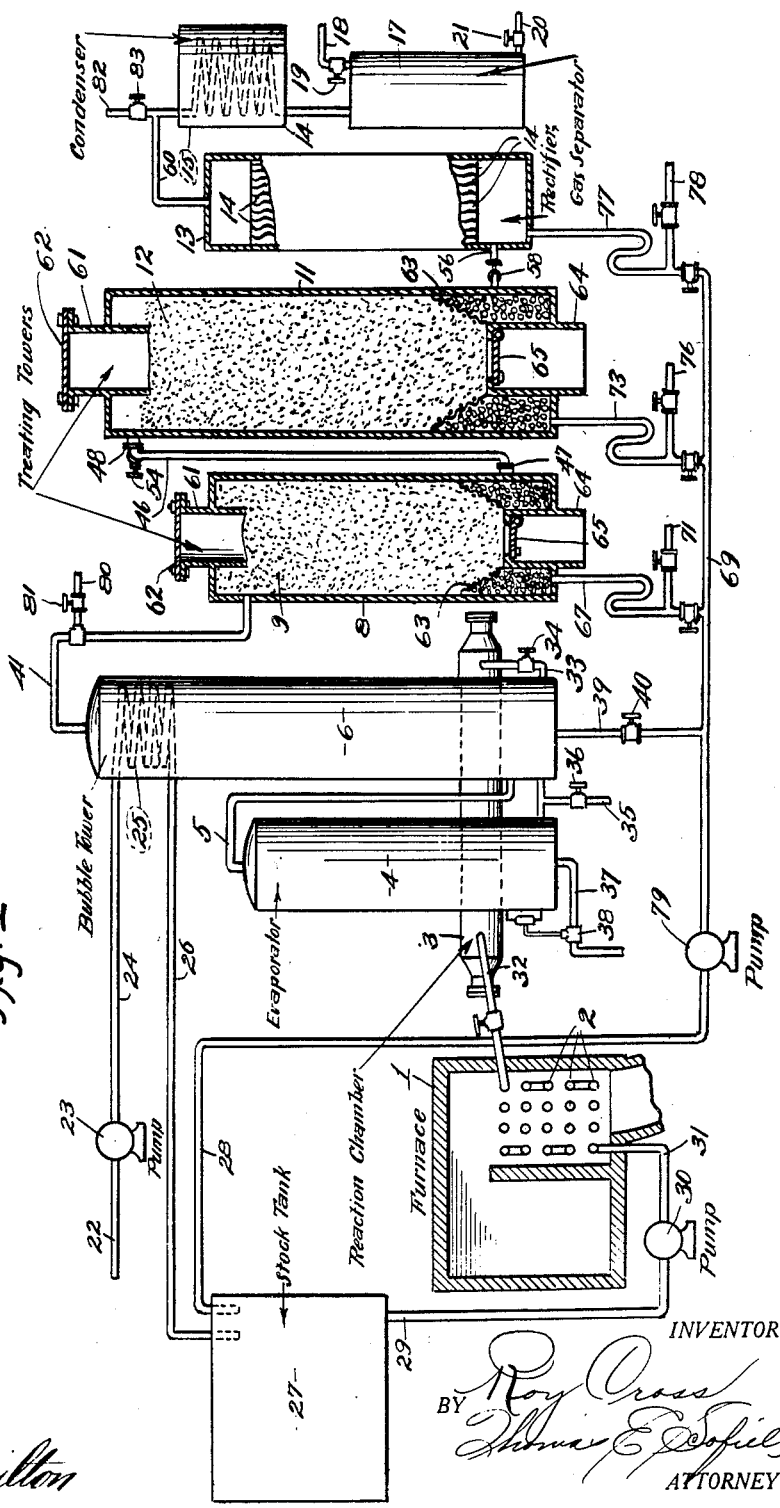
Fig. 1 is a diagrammatic side elevational view of the apparatus with parts in section and parts broken away.
Figure 2:
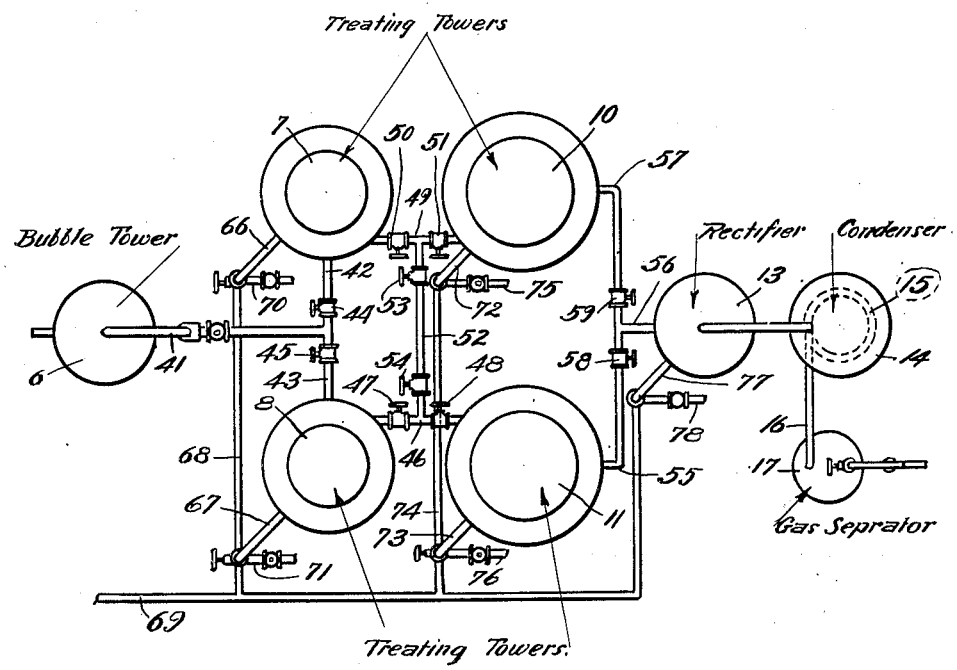
Fig. 2 is a plan view of that portion of the apparatus having to do with the purification or treating operations.

Referring to the drawings, at 1 is shown a furnace in which are mounted the heating tubes 2. Three (3) is a reaction chamber, preferably fabricated from a single ingot of forged steel and heavily insulated to prevent loss of heat by radiation. Removable end openings or manhole plates are fitted to the reaction chamber to facilitate the cleaning of the chamber. Four (4) is an evaporator connected by a vapor line 5 to the dephlegmating tower 6 which is preferably of the bubble type; 7 and 8 are treating towers containing a metal compound 9 having an affinity for the sulphur compounds of the vapor; 10 and 11 are treating towers containing a highly adsorbent material such as charcoal, adsorbent carbon, adsorbent clay materials typical of which is bentonite found in the Western States, particularly in Death Valley region in California, in Montana and the Dakotas, also fullers earth and other like absorbent purifying materials; 13 is a rectifier having therein corrugated baffles diagrammatically shown at 14 for obstructing the passage of the vapors to the extent that any mechanically entrained mist or liquid products will be separated from the vapors. A water cooled condenser is shown at 14 containing a coil 15, the discharge end of which communicates through a line 16 with the gas separator 17, the latter being equipped with a gas relief line 18 regulated by a valve 19 and a liquid drawoff line 20 regulated by a valve 21.

The oil is introduced to the system from any convenient source through the pipe 22 and is circulated by means of a pump 23 and line 24 through a preheating coil 25 positioned on the top of the tower 6. This preheating coil serves not only to preheat the incoming charging stock but also as a refluxing device for the vapors which rise into the top of the tower. The preheated oil discharged from the coil is directed from the line 26 to a stock tank 27 where it is mixed with condensate returned through the line 28 and the combination or mixture charged to the heating tubes through the line 29, pump 30 and pipe 31.

In the heating coil the oil is raised to a conversion or cracking temperature. The rate of heating and the velocity of oil through the coils is controlled to prevent any substantial decomposition of the oil in the tubes, i. e., the heating is so regulated that it arrives at a cracking temperature substantially on its discharge from the coil and the velocity at which it is traveling prevents the deposition of any free carbon which may be separated on its arriving at a conversion temperature. The highly heated oil is passed through the transfer line 32 to the reaction chamber 3 where it is accumulated in a considerable body in a relatively stagnant state and during its flow passage through the reaction chamber it is given ample time for relatively complete digestion or a completion of the cracking action which was initiated in the heating coil. As mentioned, loss of heat is minimized by heavy insulation on this chamber. The cracked hydrocarbon products are discharged from the reaction chamber through the transfer line 33 in which is interposed a pressure reduction valve 34. This line communicates with the evaporating tower 4 into which the highly heated oil is discharged and the pressure reduced resulting in an evaporation of the lighter fractions due to the pressure reduction and the contained heat of the oil. A cooler hydrocarbon medium may be added through the line 35 controlled by a valve 36 or steam or a combination of a cool hydrocarbon and steam injected to prevent excessive evaporation in the tower 4. The lighter fractions evaporated from the oil in the tower 4 passes off through the vapor line 5 and are introduced into the bottom of the dephlegmating column 6 through which they rise and during their travel therethrough are brought in intimate contact with cooler condensates gravitating downwardly through the tower. Unvaporized products are drawn off from the bottom of the evaporator through the line 37 automatically or manually controlled by a valve 38 while condensates are removed from the tower 6 through the pipe 39 by automatic or manual manipulation of the valve 40. The uncondensed vapors rising through the bubble tower 6 pass off through the pipe 41.

The operation to this point is substantially that of a standard type of cross cracking unit, including the subsequent distillation of the synthetic crude or crude equivalent and the fractionation of the vapors by means of the bubble tower 6. The vapors passing overhead through the line 41 consists primarily of vapors and gases having an end boiling point of from 400° F. to 500° F. Normally, the operation is such that the end boiling point is substantially such as that of commercial gasoline, namely, 437° F. These vapors and gases are conducted into either of the towers 7 or 8 through the lines 42 or 43 regulated by the valves 44 and 45, respectively. The purpose of having alternate towers is to furnish an extra tower in case one is to be cut out of the system for cleaning. For the same reason the separate towers 10 and 11 are furnished so that the towers containing the adsorbent material may be cut out of the system for regeneration of the treating material and cleaning of the tower. In the event that the tower 8 is being used, the valve 44 in the line 42 is closed and the oil vapors are directed through the line 43 to the tower 8. The vapors are introduced near the top of the tower and caused to pass downwardly through the metallic compound being discharged from the bottom of the tower through the line 46 which directs the vapors and gases into the top of the tower 11. Valves 47 and 48 are interposed in the line 46. In a like manner, the tower 7 is connected by means of a line 49 regulated by valves 50 and 51 to the tower 10 and a connection line 52 communicates between the lines 46 and 49, the latter line having valves 53 and 54 for controlling the direction of the vapors from either of the towers 7 or 8.

In the operation now being explained, the valve 54 is closed and the valves 47 and 48 are opened, permitting the vapors and gases to pass from the tower 8 directly into the top of the adsorbent tower 11. The vapors introduced to the top of the tower 11 pass downwardly through the adsorbent material 12 and are discharged through the pipe 55 which communicates with the pipe 56 which is connected into the bottom of the rectifier 14. A similar drawoff line 57 from the tower 10 connects that tower with the line 56. Valves 58, in the line 55, and 59, in the line 57, serve to isolate the towers 10 and 11 insofar as their discharge is concerned. The vapors and gases, after passing through the rectifier, are directed off through the line 60 to the condenser 14 where they are subjected to a final condensing action and pass as liquid distillate into the gas separator 17.

The treating towers are of substantially the same construction, so a description of one will be adequate as a description for all. They consist primarily of an outer shell designated by the numbers 7, 8, 10 and 11. The towers have a restricted top portion 61 which is equipped with a removable manhole 62. In the lower part of the towers are inverted truncated conical shaped screens 63 of sufficiently fine mesh to support the material contained in the tower and at the same time permit the passage of the vapors therethrough. A cylindrical discharge tube 64 extends into the bottom of each tower and in the throats of these tubes are hinged closures 65. The annular space between the shells of the towers and the outer periphery of the tubes 64 are filled in by a broken filler material of considerably larger size than the material contained in the tower. This material is inert and serves merely to retard the washing of the treating material through the screens, permitting at the same time a free passage of the vapors to the discharge pipe from the towers. The towers 7 and 8 and condensate draw offs 66 and 67, respectively, communicate with a common line 68 which leads to the return line 69. Auxiliary lines 70 and 71 are supplied for diverting the condensate if desired. The towers 10 and 11 are equipped with condensate drawoffs 72 and 73 communicating with a common line 74 which also has connection with the return line 69. Pipes 75 and 76 may be used for diverting the distillate separated out in the towers 10 and 11 from the system.

The rectifying column 13 has a condensate draw off line 77 which has communication with the line 69. Secondary connection 78 may be used for diverting this condensate from the system. The liquid material directed to the line 69 through the draw off pipes from the towers 6, 7, 8, 10, 11 and 14 are returned and by means of the pump 79 charged through the line 28 to the stock tank 27 where it is combined with the incoming charging stock and recirculated through the cracking system.

In the towers 7 and 8 a metallic compound, such as metallic copper, copper scale, oxides of copper, iron or salts of metals having an affinity for the sulphur compounds of the oil vapors, is used. In the towers 10 and 11 adsorbent materials, such as fuller's earth, gelatinized clay, including a number of hydrous aluminum silicates having highly adsorbent qualities, charcoal, or other organic or inorganic adsorbent materials assisting in the purification of the oil vapors, may be utilized. A highly adsorbent inorganic gelatinized clay, such as hydrous aluminum silicate commercially known as bentonite, has proved highly effective as a purifier in this connection. It will be noted that both the vapors and gases are passed through the purifying stages of the towers and the materials, as a final treatment, is subjected to rectification and a final condensation, after which it is collected as a finished colorless, odorless and sweetened distillate.

The towers are heavily insulated to prevent loss of heat through radiation, and it may be desirable under certain conditions to jacket the towers and circulate a heating medium thereabouts to maintain the proper temperature of the treating materials and vapors.

The treatment is made continuous by the use of alternate towers for each stage of treatment, permitting one of either type to be cut out of the system while the other is being used. The treating material may be removed from the towers through the bottom closure 65 and, after regeneration, recharged through the top of the towers through the restricted portion 61 flanged to receive the removable plate 62.

With reference to the particular metals available and adaptable for this purpose, copper is perhaps as cheap and as effective as any. A very useful form of copper is the copper scale obtained from copper rolling mills. When first used, this will be charged in metallic form, but on regeneration and removal of sulphur, it will be transformed to a copper oxide. The particular character of the metallic material which is used does not seem to be of any great importance provided it is active in its avidity for sulphur; therefore it must be substantially free from sulphur compounds. The metal treatment serves primarily to deodorize and desulphurize the hydrocarbon vapors besides considerably improving the ultimate distillate as to its gumming properties. The bleaching or decolorizing is effected in the second zone of treatment, namely, the treatment with the adsorbent material.

In actual practice, it has been found that the adsorbent material and the metal do not lose their activity at the same rate and consequently it may be necessary to cut out a tower of one stage of the treatment without cutting out the corresponding tower of the secondary stage. A further advantage of the separate towers for the different types of treatment is that the material can be regenerated more rapidly and more effectively when handled separately.

A pipe 80, controlled by a valve 81, is connected into the pipe 41 for diverting the oil around the treating towers directly into the condenser through the broken off pipe 82 having a valve 83, if desired.

Under certain conditions, it may prove an advantageous practice to have in addition to a bleaching material, such as clay or other adsorbent materials as described, a metallic substance mixed directly with the adsorbent material; this being in addition to the metal treatment which the oil vapors will receive in the tower 8. The adsorbent material, when combined with the metal, would be similar in character to that described in my Patent No. 1,515,833, issued November 18, 1924.

In addition to the metals described, namely, copper, iron, or other metals generally mentioned as having a particular affinity for sulphur, when it is desired to eliminate sulphur solely, such metals may be used as sodium, potassium or calcium which are particularly effective although at the present time somewhat more expensive than the more common metals described. However, when economic conditions permit, the latter metals are somewhat more effective than the more common metals, such as copper and iron.

Besides the arrangement of the apparatus which is shown in the drawings, under certain conditions it may be sufficient to treat with either the metallic substance or with the adsorbent material separately. In that event, connections would be provided to cut out either the adsorbent treatment or the metal treatment from the system and utilize the one which remains.

I claim as my invention:

1. An apparatus for treating oil, comprising a cracking unit including heating tubes and a reaction chamber, connected evaporator and reflux towers in communication with the chamber, a plurality of treating towers, one of said towers being charged with solid desulphurizing material and another of said towers being charged with solid adsorptive material means to conduct gases and vapors from the reflux tower serially through the treating towers, a rectifier connected to the treating towers, and means to recover the treated vapors as a liquid condensate.

2. An apparatus for treating oil comprising a cracking unit, a reflux tower connected to said cracking unit, a plurality of treating towers, one of said towers being charged with solid desulphurizing material and another of said towers being charged with solid adsorptive material, means to conduct gases and vapors from the reflux tower through said treating towers in succession, and a rectifier connected to one of said towers.

3. An apparatus for treating oil comprising a cracking unit including heating tubes and a reaction chamber, connected evaporator and reflux towers in communication with the chamber, a plurality of sets of treating towers, means to conduct gases and vapors from the reflux tower downwardly through the sets of the treating towers, a rectifier connected to the treating towers, and means to recover the treated vapors as a liquid condensate.

4. An apparatus for treating oil comprising a cracking unit including heating tubes and a reaction chamber, connected evaporator and reflux towers in communication with the chamber, a plurality of sets of treating towers, means to selectively conduct gases and vapors from the reflux tower downwardly through one set of treating towers, a rectifier connected to the treating towers, and means to recover the treated vapors as a liquid condensate.

5. An apparatus for treating oil comprising a cracking unit including heating tubes and a reaction chamber, connected evaporator and reflux towers in communication with the chamber, a plurality of sets of treating towers each tower in a set containing different treating materials, means to selectively conduct gases and vapors from the reflux tower downwardly through one set of treating towers, a rectifier connected to the treating towers, and means to recover the treated vapors as a liquid condensate.

6. An apparatus for treating oil comprising a cracking unit including heating tubes and a reaction chamber, connected evaporator and reflux towers in communication with the chamber, a plurality of sets of treating towers, each tower in a set containing different treating materials and each set of towers containing the same treating materials, means to selectively conduct gases and vapors from the reflux tower downwardly through a plurality of treating towers containing different treating materials, a rectifier connected to the treating towers, and means to recover the treated vapors as a liquid condensate.

ROY CROSS.